United States Patent

Musacchia, Sr.

[11] Patent Number: 5,513,622
[45] Date of Patent: May 7, 1996

[54] FASTENING DEVICE

[76] Inventor: John Musacchia, Sr., 2100 Barrett Park Dr., Suite 504, Kennesaw, Ga. 30144

[21] Appl. No.: 222,037

[22] Filed: Apr. 4, 1994

[51] Int. Cl.⁶ ..................................................... F41B 5/20
[52] U.S. Cl. ............................... 124/89; 124/86; 403/349
[58] Field of Search .................................. 124/23.1, 24.1, 124/25.6, 44.5, 86, 88, 89; 403/348, 349, 301, 315, 320; 285/361, 396, 402

[56] References Cited

U.S. PATENT DOCUMENTS

| | | | |
|---|---|---|---|
| 1,171,380 | 2/1916 | Arthur | 403/349 X |
| 2,601,088 | 6/1952 | Burgess | 403/349 X |
| 2,793,902 | 5/1957 | Govan | 403/349 X |
| 2,820,655 | 1/1958 | Hileman | 403/349 |
| 3,412,725 | 11/1968 | Hoyt | 124/89 X |
| 3,423,781 | 1/1969 | Henson | 403/349 X |
| 3,524,441 | 8/1970 | Jeffery | 124/89 |
| 4,518,162 | 5/1985 | Oates . | |
| 4,661,009 | 4/1987 | Tripp | 403/349 |
| 5,038,510 | 8/1991 | Duke | 124/86 X |
| 5,052,849 | 10/1991 | Zwart | 403/349 X |
| 5,094,464 | 3/1992 | Musacchia, Sr. | 273/419 |
| 5,178,122 | 1/1993 | Simonds | 124/25.6 |
| 5,388,563 | 2/1995 | Hsu | 124/23.1 |

FOREIGN PATENT DOCUMENTS

| | | | |
|---|---|---|---|
| 676374 | 2/1930 | France . | |
| 1429924 | 3/1976 | United Kingdom | 403/349 |

*Primary Examiner*—Eric K. Nicholson
*Assistant Examiner*—John Ricci
*Attorney, Agent, or Firm*—Richard C. Litmam

[57] ABSTRACT

A fastening device including a plug section that is readily manipulated to quickly engage and disengage a socket section. The plug section is provided with a forwardmost elongated plug that is insertable into a bore in the socket section. Guidance and locking together of the two sections or components is achieved through a pin which extends radially from the elongated plug and which is received by a multi-directional slot arrangement associated with the socket section. Short of achieving a fully assembled condition, an axially disposed, compressible member may extend from the face end of the elongated plug to engage a stop or an end wall within the bore of the socket section and thereafter produce a constant biasing force that in addition to assuring a rigid rattle-free attachment and maintain the components in a locked position. Removal of the fastening device requires a positive forward displacement of the plug relative the socket section against the force of the compressible member prior to a compound angular and axial movement between the components. A knurled lock-nut may be used in combination with or independent of a compressible member to provide a constant biasing force as well. The lock-nut is threadably engageable with the plug element and is displaceable to frictionally engages the socket section and present against cooperatively engaging guide and catch elements.

4 Claims, 4 Drawing Sheets

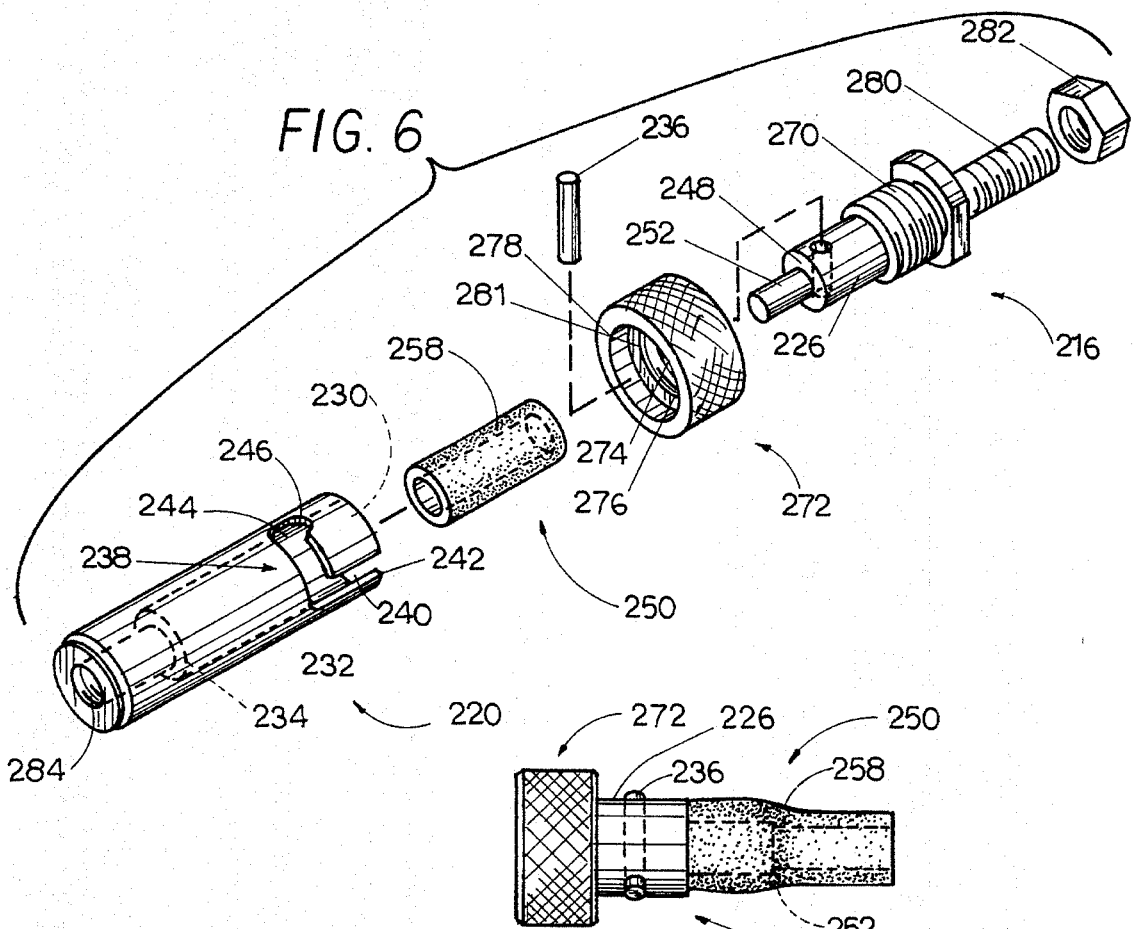
FIG. 6
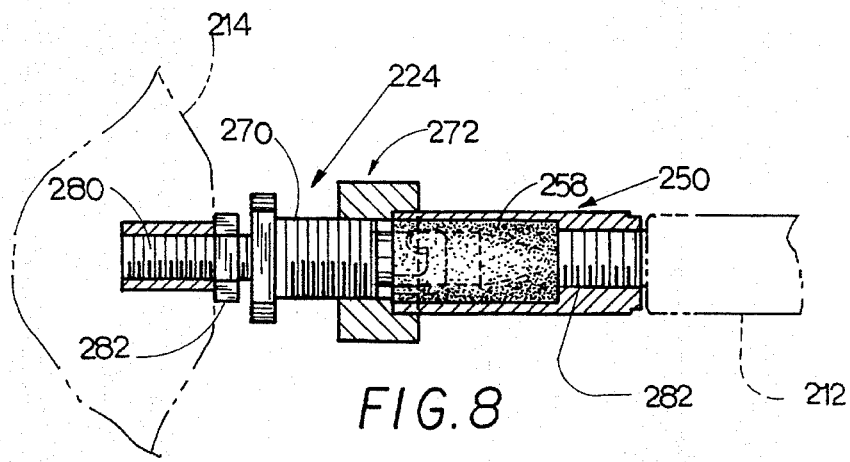
FIG. 7
FIG. 8

FASTENING DEVICE

FIELD OF THE INVENTION

This invention relates generally, to fastening devices and more particularly, to an improved fastener for abutting members and which includes plug and socket members and which serve to rigidly affix the abutting members together following a simple axial and rotational displacement between the plug and socket members.

BACKGROUND OF THE INVENTION

The need for a fastening assembly allowing for the rapid and positive connection between two members will become evident in unlimited endeavors. As an example, one may consider the popular sport of bowfishing wherein an archer is able to practice his skill in hunting at any time of the year and is not confined to the more restrictive open seasons for conventional land based game, since one may usually always find open fishing seasons in not too distant streams, lakes, bays or the open waters. In my earlier U.S. Pat. No. 5,094,464 issued Mar. 10, 1992, an example of a releasable fastening system will be found and which is particularly described in connection with either the head or nock section of an arrow.

Consider also a typical compound bow wherein, upon release of an arrow, the string oscillates and the bow recoils. This is an undesirable effect which can be significantly reduced through the application of a bow stabilizer which comprises a shaft having one end attachable to the bow structure and an opposite end for supporting a weight or mass. It is often cumbersome to transport the bow with the stabilizer extending therefrom, particularly when traversing through underbrush. For this reason, the stabilizer should lend itself to the quick and easy attachment to and removal from the bow. A quick-release fastening assembly is a suitable solution for attaching the stabilizer to the bow.

The concept as proposed herein is readily adaptable in providing a quick and positive coupling mechanism for use between two opposing or adjacent members, as will become evident hereinafter.

DESCRIPTION OF THE PRIOR ART

Numerous examples exist of quick-release fasteners particularly adapted for abutting members. U.S. Pat. No. 3,423,781, issued Jan. 28, 1969 to Harry H. Henson, and U.S. Pat. No. 4,518,162, issued May 21, 1985 to William J. Oats, and French Patent No. 676.374, published Feb. 21, 1930 to COVEDA, each illustrate typical quick-release fasteners which are axially and rotationally displaceable to engage and disengage the same.

A common construction exists among these quick-release fasteners wherein each fastener includes a first elongated member, defined by a sleeve, and a second elongated member engageable with the first elongated member. Each sleeve has at least one bayonet slot in its sidewall for receiving a cam lock pin which extends transversely from each of the second elongated members. Each of the sleeves has a biasing spring disposed therein for retaining the two elongated members in a coupled posture. No suggestion is seen in the known prior art of the unique combination as set forth hereinafter.

SUMMARY OF THE INVENTION

By the present invention, an improved quick-release fastener is provided which includes a movement resisting joint assembly having two components cooperating with one another to permit a quick and positive attachment and removal of two abutting elements. In one embodiment, a compressible member extending from the end face of the plug on the forward portion of one male component acts upon the forwardly facing lateral surface within the rear of a bore in the other female component of the assembly, to present a constant biasing force against the plug as guide and catch elements respectively on the assembly permit an interlock or separation of the two components and, in turn, an interlock or separation of the abutting elements. Alternatively, a knurled lock-nut presents a constant biasing force against a female component to permit an interlock or separation of the two components. As yet another alternative, a novel combination of both the compressible member and the knurled lock-nut each present a separate and independent constant biasing force against a female component to permit an interlock or separation of the two components.

Accordingly, one of the objects of the present invention is to provide an improved quick-release fastener providing a movement resistant joint assembly.

It is another object to provide a quick-release fastener having a compressible member extending from a first component which serves to provide a biasing force against a second component.

Another object is to provide a quick-release fastener having a knurled lock-nut which serves to provide a biasing force against a second component relative to a first component.

Another object is to provide a quick-release fastener having a novel combination of a compressible member and knurled lock-nut each of which serve to provide a separate and independent biasing force against a second component relative to a first component.

A further object is that a first component induce a guide element adapted to cooperate with a slotted catch element in a second component.

An additional object is that two components be connectable by a push and twist interaction and that a compressible member and/or the knurled lock-nut present a biasing force for maintaining an interlock between the attached components.

It is an object of the invention to provide improved elements and arrangements thereof in an apparatus for the purposes described which is inexpensive, dependable and fully effective in accomplishing its intended purposes, without the need for applying nuts or using any tools.

These and other objects of the present invention will become readily apparent upon further review of the following specification and drawings.

BRIEF DESCRIPTION OF THE DRAWINGS

FIG. 6 is an exploded perspective view of an alternative fastening device.

FIG. 7 is a fragmentary side elevational view of a male plug element of the fastening device shown in FIG. 6.

FIG. 8 is an environmental cross-section of the fastening device shown in FIG. 7.

Similar reference characters denote corresponding features consistently throughout the attached drawings.

DETAILED DESCRIPTION OF THE PREFERRED EMBODIMENTS

Figure 1:
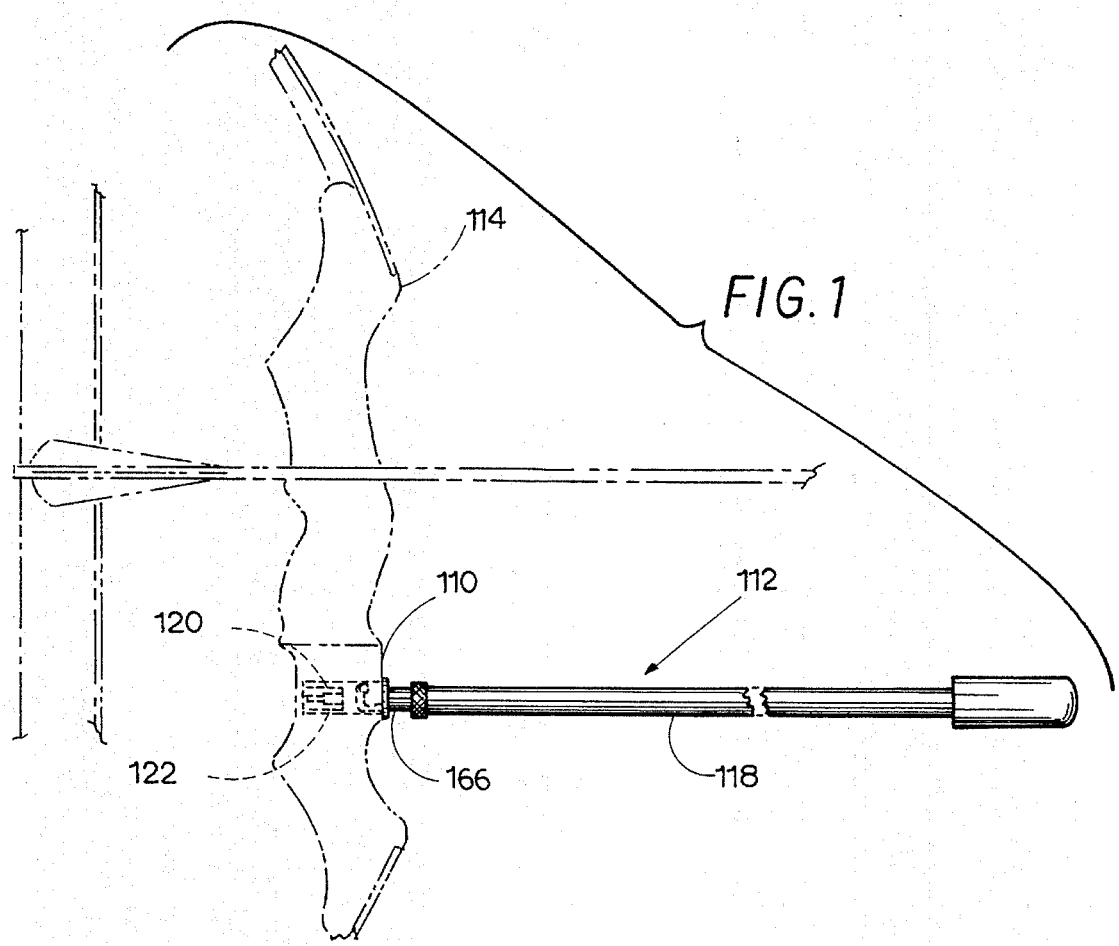
FIG. 1 is a partially hidden, environmental side elevational view of the fastening device according to the present invention.
Figure 2:
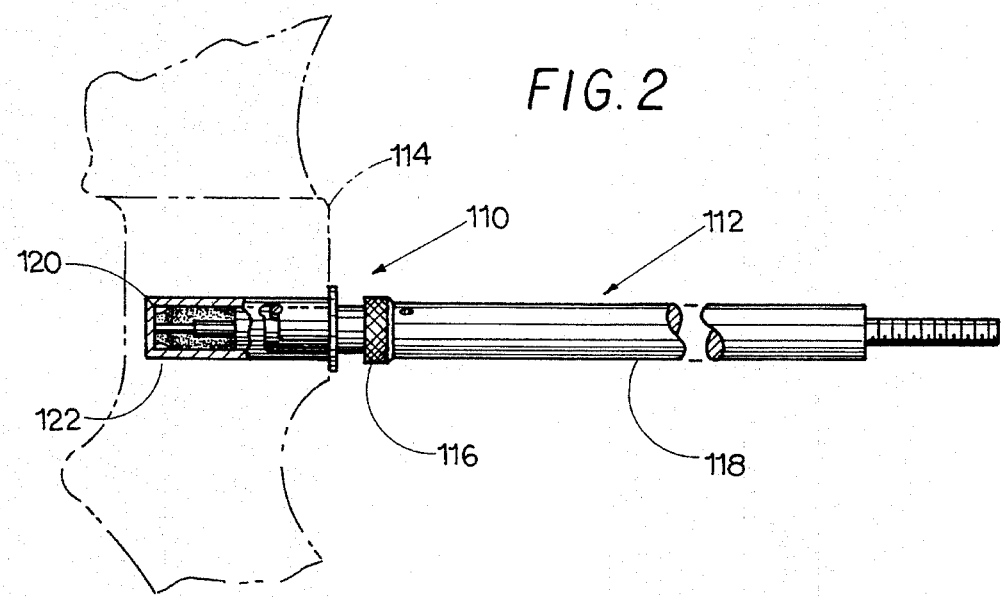
FIG. 2 is an enlarged partially cutaway, side elevational view of the fastening device shown in FIG. 1 with the bow appearing in phantom lines.

Referring now to the drawings, particularly FIGS. 1 and 2, the present invention is understood to relate to a fastening device generally designated 110. The fastening device 110 is a movement-resistant joint assembly for abutting members, such as the bow stabilizer 112 and the compound bow 114 shown. The fastening device 110 includes a first component 116 shown integral with the shaft 118 of the bow stabilizer 112 and a second component 120 seated in a socket 122 of the bow 114. The composition of the stabilizer 112 itself and the specific construction of the bow 114 are not critical to an understanding of the current invention since the important feature herein lies with the fastening device 110.

Figure 3:
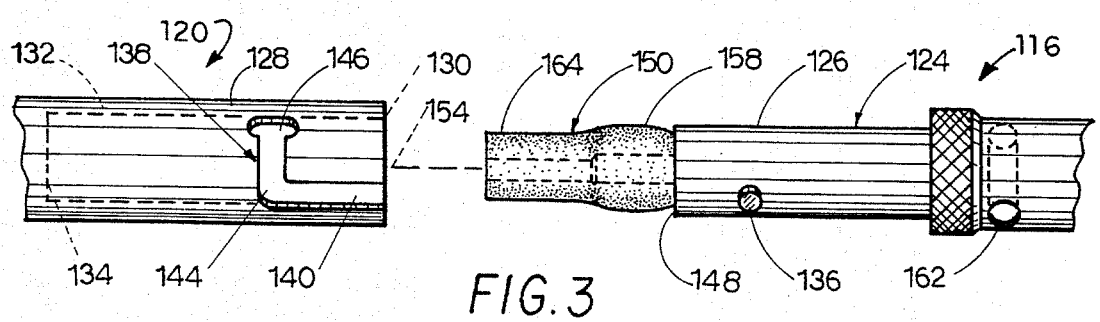
FIG. 3 is a fragmentary side elevational view of the fastening device in an unfastened posture.
Figure 5:
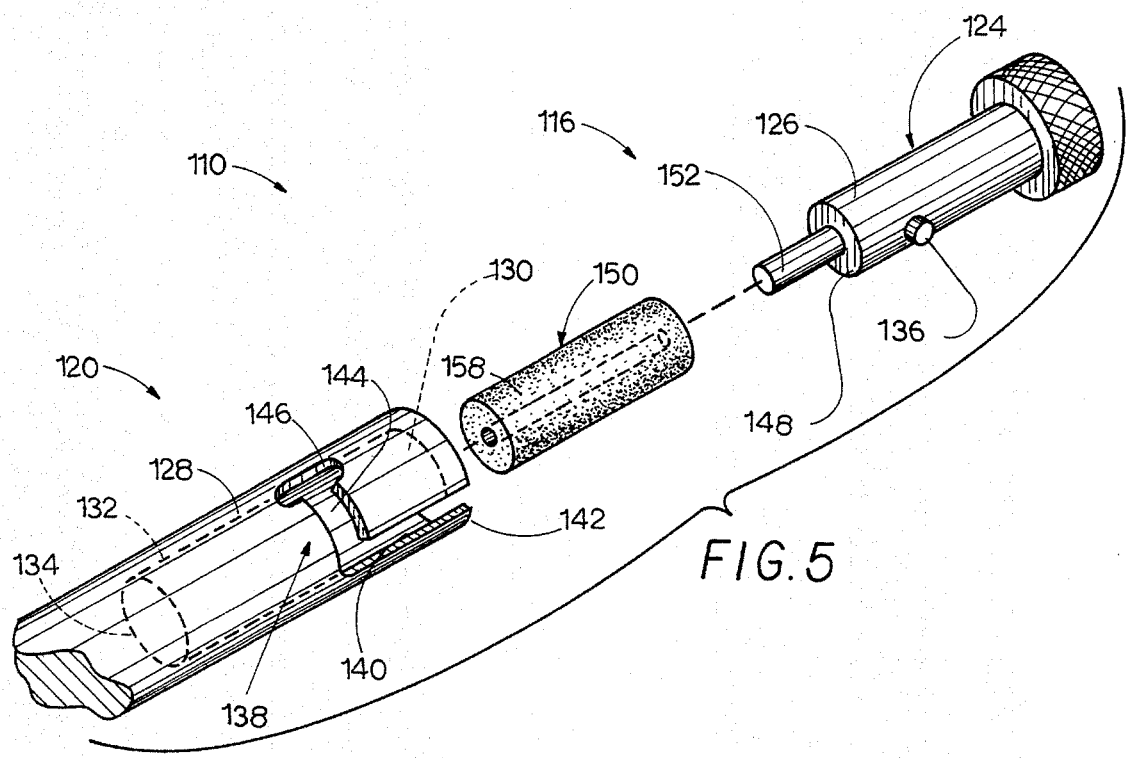
FIG. 5 is an exploded, fragmentary perspective view of the fastening device.

As shown more specifically in FIGS. 3 and 5, the first component 116 is an elongated component defined as a main plug section or body from which extends an elongated, forward tang or plug element 124 preferably having a cylindrical periphery 126. The second component 120 is an elongated cylindrical member defined as an adaptor or socket section which cooperates with the plug element 124.

The reduced diameter of the first component forward plug element 124 is adapted to form a close sliding fit within the confines of the axially extending socket or bore 130 within the rear of the adaptor or socket tubular wall 132. The forward limit of the bore 130 will be defined by a stop or end wall 134.

The secure joining of the removable plug section 116 to the fixed adaptor or socket section 120 is accomplished through the interaction of a guide element 136 on the plug element 124 and catch means 138 on the cooperating socket section 120. The guide element 136 comprises a pin radially projecting from the intermediate area of the plug element periphery 126. The guide pin 136 has a length no greater than the thickness of the adaptor wall 132 surrounding the bore 130. The catch means 138 will be seen to include a multi-channel arrangement comprising a longitudinal slot 140 through the adaptor wall 132 and which extends forwardly from the rear edge 142, joining with a transverse slot 144 which in turn joins with a rearwardly directed catch notch or slot 146.

Figure 4:
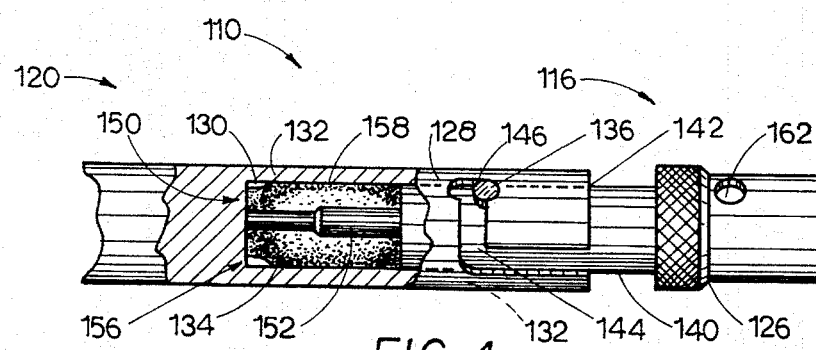
FIG. 4 is a partial cutaway, fragmentary side elevational view of the fastening device in a fastened posture.

To provide a resilient cushion when the plug element end face 148 approaches the socket bore end wall 134, and to present a constant rearward biasing action upon the coupled components, a compressible, resilient member 150 is axially supported by a reduced diameter projection 152 extending from the end face 148 of the plug element 124. This member 150 may comprise any suitable composition but preferably consists of a short section of tubing manufactured of natural or synthetic elastomeric composition. Conventional surgical tubing has been found to meet the requirements of this invention quite nicely, particularly in view of its ready availability and low cost. When a short section of this tubing 150 is placed, as shown clearly in FIG. 2, with its central axis 154 disposed concentrically of the axial extent of the bore 130, the natural, at-rest state of the member 150 insures that it remains in an expanded condition whereupon any deflection in a forward axial direction, as is shown in FIG. 4, will meet with the resistance offered by the material of the member 150. This resistance is enhanced due to the normal engagement of diametrically opposed portions 156—156 of the member's periphery 158 with the walls 132 of the bore 130 when at-rest. In this manner, any force urging axial compression of the member 150 and expanse of the periphery 158 of the member 150 can only produce a positive biasing action since the diameter of the member 150 is precluded from expanding.

Referring to FIG. 4, the joining of the first and second components 116, 120 to one another and thus abutting the bow stabilizer 112 and the compound bow 114, as is shown in FIGS. 1 and 2, comprises but a quick and simple maneuver. The user slips the resilient member 150 supported by the projection 152 extending from the face 148 of the plug element 124 of the plug section 116 into the open ended bore 130 of the adaptor or socket section 120, assuring that the guide pin 136 is axially aligned with the adaptor slot 140 so that as the plug section 116 is moved forward, this pin 136 enters and travels to the forward limit of the slot 140. Prior to the pin 136 reaching the transverse slot 144, the resistance of the compressible member 150 will be felt as the end wall 134 in the bore 130 engages the member 150. A decided biasing force is exhibited and remains as the pin 136 is advanced to the transverse slot 144 and thereafter, the plug section 116 is twisted or angularly displaced relative the socket or adaptor section 120 so as to advance the pin 136 to the end of the transverse slot 144. At this point, forward pressure on the plug assembly 116 is released and the biasing force of the member 150 drives the plug section 116 and its pin 136 rearwardly a short distance with the pin 136 coming to rest in the rearwardly directed stop or catch notch 146. In this assembled condition, a noticeable biasing action yet remains to insure a positive and secure attachment of the components. The separation or release of the plug section 116 from the socket section 120 is accomplished by a reversal of the foregoing steps. Thus, by pressing inwardly upon the plug section 116 against the biasing force of the compressible member 150, the pin 136 is moved to the transverse slot 144 and permits one to angularly twist the plug section 116 until the pin 136 is moved to the longitudinal slot 140, whereupon a straight rearward pulling upon the plug section 116 results in its total separation from the adaptor section 120.

The close sliding fit between the plug element 124 and bore 130 and the similar close fit between the pin 136 and the plurality of channels or slots 140, 144, 146 as well as the expansion of the member 150 within the bore 130 insures that a rattle-free fastening device is achieved while the biasing force as created by the compressed member 150 not only precludes accidental separation of the components but also allows of a quick and positive separation and reattachment thereof. The initial assembly of the plug section 116 to the adaptor section 120 is facilitated by the provision of a reduced diameter portion 164 of the member 150 advanced beyond the projection 152 extending from the plug end face 148 of the plug element 124, as is shown more clearly in FIG. 3.

The fastening device 110 according to the present invention is not limited to the application as presented above but may be used in numerous situations where two members are abutted. For example, the fastening device 110 may facilitate abutting the nock of an arrow to an arrow shaft or when abutting the arrowhead to an arrow shaft in a manner similar to that shown and described in my U.S. Pat. No. 5,094,464 issued Mar. 10, 1992. Akin to the nock and arrowhead shown and described in my former patent, the fastening device 110 according to the present invention is likewise provided with a transverse bore 162, as is shown clearly in FIGS. 3 and 5, for the tethering of a bowfishing line. It will be appreciated that a bowfisherman may quickly and safely detach the nock or arrowhead from the arrow shaft by manipulating the twist lock mechanism of the present invention.

An alternative fastening device 210, as is shown in FIGS. 6 through 8, clearly is not limited to the application as presented above but may be used as an improved fastener for rigidly affixing a myriad of axially aligned abutting members together. A first component 216 is an elongated component defined as a main plug section or body from which extends an elongated, forward tang or plug element 224 preferably having a cylindrical periphery 226. A second component 220 is an elongated cylindrical member defined as an adaptor or socket section which cooperates with the plug element 224.

The reduced diameter of the first component forward plug element 224 is adapted to form a close sliding fit within the confines of the axially extending socket or bore 230 within the rear of the adaptor or socket tubular wall 232. The forward limit of the bore 230 will be defined by a stop or end wall 234.

The secure joining of the removable plug section 216 to the fixed adaptor or socket section 220 is accomplished through the interaction of a guide element 236 on the plug element 224 and catch means 238 on the cooperating socket section 220. The guide element 236 comprises a pin radially projecting from the intermediate area of the plug element periphery 226. The guide pin 236 has a length no greater than the thickness of the adaptor wall 232 surrounding the bore 230. The catch means 238 will be seen to include a multi-channel arrangement comprising a longitudinal slot 240 through the adaptor wall 232 and which extends forwardly from the rear edge 242, joining with a transverse slot 244 which in turn joins with a rearwardly directed catch notch or slot 246.

To provide a resilient cushion when the plug element end face 248 approaches the socket bore end wall 234, and to present a constant rearward biasing action upon the coupled components, a compressible, resilient member 250 is axially supported by a reduced diameter projection 252 extending from the end face 248 of the plug element 224. Any force urging axial compression of the member 250 and expanse of the periphery 258 of the member 250 can only produce a positive biasing action since the diameter of the member 250 is precluded from expanding.

The rearward end portion of the circular periphery 226 of the plug element 224 is provided with an external thread 270. A knurled lock-nut 272 has in bore 274 in a rearward end thereof. The bore 274 is provided with an internal thread 276 therein. The internal thread is threadably engageable with the external thread 270 on the circular periphery 226 of the plug element 224. A recess or socket 278 is provided in the forward end of the knurled lock-nut 272. The recess 278 terminates in a face or forward surface 281. The recess 278 is purposed to receive the rear edge 242 of the second component 220. Upon engagement of the first and second components 216, 220, the knurled lock-nut 272 is tightened until the face 280 within the recess 278 frictionally engages the rear edge 242 of the second component 220. This ensures that the first and second components 216, 220 remain engaged with one another. To disengage the first and second components 216, 220, back the knurled lock-nut 272 off of the rear edge 242 of the second component 220.

Referring to FIG. 8, a bow stabilizer 212 and a compound bow 214, such as that shown in FIGS. 1 and 2, are shown abutted by joining of the first and second components 216,220 to one another. This is accomplished in a quick and simple maneuver. The user slips the resilient member 250 supported by the projection 252 extending from the face 248 of the plug element 224 of the plug section 216 into the open ended bore 230 of the adaptor or socket section 220, assuring that the guide pin 236 is axially aligned with the adaptor slot 240 so that as the plug section 216 is moved forward, this pin 236 enters and travels to the forward limit of the slot 240. Prior to the pin 236 reaching the transverse slot 244, the resistance of the compressible member 250 will be felt as the end wall 234 in the bore 230 engages the member 250. A decided biasing force is exhibited and remains as the pin 236 is advanced to the transverse slot 244 and thereafter, the plug section 216 is twisted or angularly displaced relative the socket or adaptor section 220 so as to advance the pin 236 to the end of the transverse slot 244. At this point, forward pressure on the plug assembly 216 is released and the biasing force of the member 250 drives the plug section 216 and its pin 236 rearwardly a short distance with the pin 236 coming to rest in the rearwardly directed stop or catch notch 246. In this assembled condition, a noticeable biasing action yet remains to insure a positive and secure attachment of the components. A supplemental biasing force is provided by tightening the knurled lock-nut 272 into contact with the rear edge 242 of the second component 220.

The separation or release of the plug section 216 from the socket section 220 is accomplished by a reversal of the foregoing steps. Thus, by first backing the knurled lock-nut 272 out of contact with the rear edge 242 of the second component 220 and then pressing inwardly upon the plug section 216 against the biasing force of the compressible member 250, the pin 236 is moved to the transverse slot 244 and permits one to angularly twist the plug section 216 until the pin 236 is moved to the longitudinal slot 240, whereupon a straight rearward pulling upon the plug section 216 results in its total separation from the adaptor section 220.

The close sliding fit between the plug element 224 and bore 230 and the similar close fit between the pin 236 and the plurality of channels or slots 240, 244, 246 as well as the expansion of the member 250 within the bore 230 insures that a rattle-free fastening device is achieved while the biasing force as created by the compressed member 250 not only precludes accidental separation of the components but also allows of a quick and positive separation and re-attachment thereof. Moreover, a close sliding fit between the plug element 224 and the recess 278 of the knurled lock-nut 272 ensures that a rattle-free fastening device is achieved provided with a supplemental biasing force which further precludes accidental separation of the components.

Figure 9:
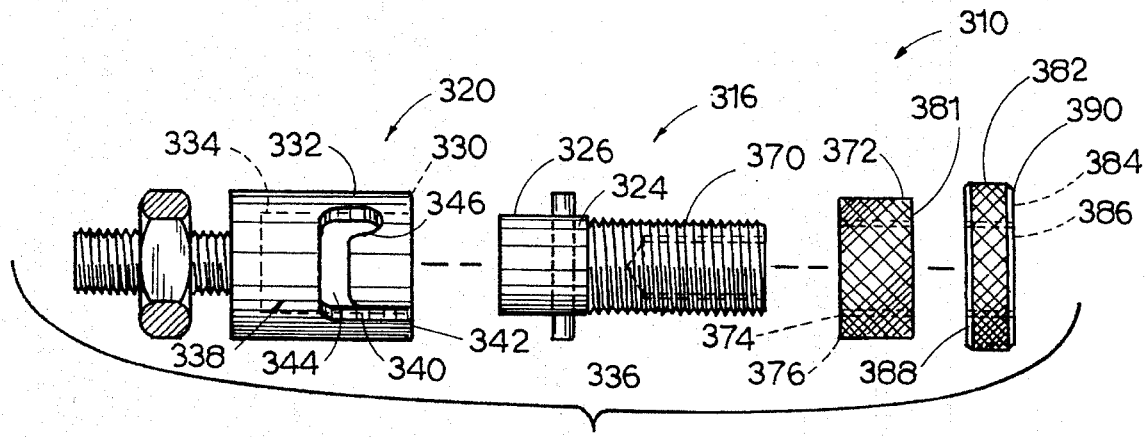
FIG. 9 is a partially exploded side elevational view of another fastening device in an unfastened posture.
Figure 10:
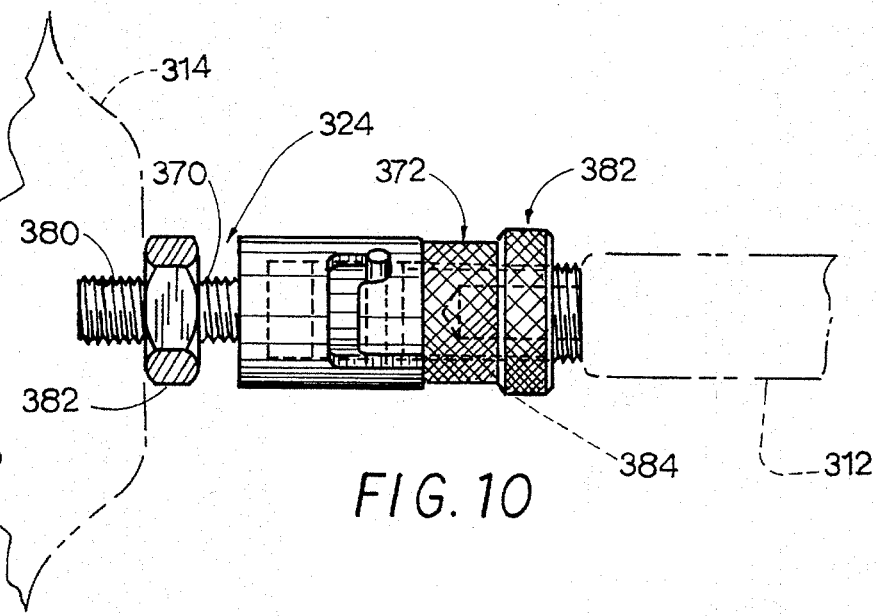
FIG. 10 is an elevational view of the fastening device shown in FIG. 9 in a fastened posture.

Another alternative fastening device 310 is shown in FIGS. 9 and 10. In accordance with this device 310, a first component 316 is an elongated component defined as a main plug section or body from which extends an elongated forward plug element 324, preferably having a cylindrical periphery 326. A second component 320 is an elongated cylindrical member defined as an adaptor or socket section which cooperates with the plug element 324.

The diameter of the first component forward plug element 324 is adapted to form a close sliding fit within the confines of the axially extending socket or bore 330 within the rear of the adaptor or socket tubular wall 332. The forward limit of the bore 330 will be defined by an end wall 334.

The secure joining of the removable plug section 316 to the fixed adaptor or socket section 320 is accomplished through the interaction of a guide element 336 on the plug element 324 and catch means 338 on the cooperating socket section 320. The guide element 336 comprises a pin radially projecting from the forward end of the plug element periphery 326. The guide pin 336 has a length no greater than the thickness of the adaptor wall 332 surrounding the bore 330. The catch means 338 will be seen to include a multi-channel arrangement comprising a longitudinal slot 340 through the adaptor wall 332 and which extends forwardly from the rear edge 342, joining with a transverse slot 344 which in turn joins with a rearwardly directed catch notch or slot 346.

The rearward end portion of the circular periphery 326 of the plug element 324 is provided with an external thread 370. A first knurled lock-nut 372 has in bore 374 therethrough. The bore 374 is provided with an internal thread 376 therein. The internal thread 376 is threadably engageable with the external thread 370 on the circular periphery 326 of the plug element 324. The knurled lock-nut 372 terminates in a face or forward surface 380. Similar to the first knurled lock-nut 372, a second knurled lock-nut 382 has in bore 384 therethrough. The bore 384 is provided with an internal thread 386 therein. The internal thread 386 is threadably engageable with the external thread 370 on the circular periphery 326 of the plug element 324. The knurled lock-nut 382 terminates in a face or forward surface 390. Upon engagement of the first and second components 316, 320, the first knurled lock-nut 372 is tightened until the face 380 frictionally engages the rear edge 342 of the second component 320. This ensures that the first and second components 316, 320 remain engaged with one another. Subsequently, the second knurled lock-nut 382 is tightened until the face 390 frictionally engages the rear edge 381 of the first knurled lock-nut 382. To disengage the first and second components 316, 320, back the second knurled lock-nut 382 off of the first knurled lock-nut 372.

Referring to FIG. 10, a bow stabilizer 312 and a compound bow 314 are shown abutted by joining of the first and second components 316, 320 to one another. This is accomplished in a quick and simple maneuver. The user slips the plug element 324 of the plug section 316 into the open ended bore 330 of the adaptor or socket section 320, assuring that the guide pin 336 is axially aligned with the adaptor slot 340 so that as the plug section 316 is moved forward, this pin 336 enters and travels to the forward limit of the slot 340. The plug section 316 is twisted or angularly displaced relative the socket or adaptor section 320 so as to advance the pin 336 to the end of the transverse slot 344. At this point, rearward pressure on the plug assembly 316 is applied to drive the plug section 316 and its pin 336 rearwardly a short distance with the pin 336 coming to rest in the rearwardly directed stop or catch notch 346. In this assembled condition, a the first knurled lock-nut 372 is tightened into contact with the rear edge 342 of the second component 320 and subsequently, the second knurled lock-nut 382 is tightened into contact with the rear edge 381 of the first knurled lock-nut 372.

The separation or release of the plug section 316 from the socket section 320 is accomplished by a reversal of the foregoing steps. Thus, by first backing the second knurled lock-nut 382 out of contact with the rear edge 381 of the first knurled lock-nut 372, backing the first knurled lock-nut 372 out of contact with the rear edge 342 of the second component 320, pressing inwardly upon the plug section 316 to move the pin 336 to the transverse slot 344 and permit one to angularly twist the plug section 316 until the pin 336 is moved to the longitudinal slot 340, whereupon a straight rearward pulling upon the plug section 316 results in its total separation from the adaptor section 320.

The close sliding fit between the plug element 324 and bore 330 and the similar close fit between the pin 336 and the plurality of channels or slots 340, 344, 346 as well as the frictional engagement of the knurled lock-nuts 372, 382 insures that a rattle-free fastening device is achieved while the knurled lock-nuts 372, 382 not only precludes accidental separation of the components but also allows of a quick and positive separation and re-attachment thereof.

The fastening device 310 according to this embodiment is clearly structured and configured to retrofit existing compound bows and stabilizers. The first component 316 according to this embodiment further includes a bore 384. The bore 384 is provided with an internal thread. The threaded bore 384 is matingly engageable with a stabilizer, such as the stabilizer 312 shown. The forward end of the second component 320 has forwardly extending stud 380. The stud 380 is shown to be provided with an external thread having a length and pitch suitable for threadably engaging a bow, such as the compound bow 314 shown in FIG. 10. A lock-nut 382 carried by the threaded stud 380 may be tightened against the bow 314 to reduce the risk of the stud 380 inadvertantly backing out of the bow 314. The threaded stud 380, lock-nut 382, and threaded bore 384 in combination further ensure that a rattle-free, retrofit fastening device 310 is achieved.

It is to be understood that the present invention is not limited to the embodiments described above, but encompasses any and all embodiments within the scope of the following claims.

I claim:

1. A fastening device comprising:

a socket section having a bore terminating in an end wall, a plug section including a plug element having a periphery insertable within said socket section bore and terminating in a forward end face, guide means radially extending from said plug element periphery, catch means in said socket section adapted to receive said guide means upon insertion of said plug element within said socket section bore, said catch means including lock means, and means for maintaining said guide means within said lock means to securely connect said socket and plug sections relative one another a portion of said periphery of said plug element being externally threaded, and said means for maintaining said guide means within said lock means including:

a first lock-nut threadably engageable with said externally threaded portion of said periphery of said plug element, said first lock-nut being frictionally engageable with said socket section and presenting a constant force against said guide means in said catch means, and a second lock-nut threadably engageable with said externally threaded portion of said periphery of said plug element, said second lock-nut being frictionally engageable with said first lock-nut and providing a constant force against said first lock nut and said socket section.

2. A fastening device according to claim 1, further including:

a bow stabilizer having opposite ends, one said section being affixed to one said bow stabilizer end and the other said section being engageable with a bow.

3. A fastening device comprising:

a socket section having a bore terminating in an end wall;

a plug section including a plug element having a periphery insertable within said socket section bore and terminating in a forward end face;

a projection axially extending forwardly from said plug section forward end face, said projection having a reduced diameter relative to said plug element;

guide means radially extending from said plug element periphery;

catch means in said socket section adapted to receive said guide means upon insertion of said plug element within said socket section bore, said catch means including lock means; and means for maintaining said guide means within said lock means to securely connect said socket and plug sections relative one another, said means for maintaining said guide means within said lock means including at least a compressible resilient member connected to and extending axially from said projection, said compressible resilient member including an elastomeric element.

4. A fastening device according to claim 3, further including:

a bow stabilizer having opposite ends, one said section being affixed to one said bow stabilizer end and the other said section being engageable with a bow.

\* \* \* \* \*